(No Model.)

A. O. HUBBARD.
WHEEL.

No. 435,358.  Patented Aug. 26, 1890.

Witnesses
S. W. Roberts.
J. Jensen

Inventor
Arthur O. Hubbard.
By Paul & Merwin Atty's.

UNITED STATES PATENT OFFICE.

ARTHUR O. HUBBARD, OF PARKER, MINNESOTA, ASSIGNOR TO SUSAN S. HUNTER, OF SAME PLACE.

WHEEL.

SPECIFICATION forming part of Letters Patent No. 435,358, dated August 26, 1890.

Application filed March 1, 1890. Serial No. 342,300. (No model.)

*To all whom it may concern:*

Be it known that I, ARTHUR O. HUBBARD, of Parker, in the county of Hennepin and State of Minnesota, have invented certain Improvements in Wheels, of which the following is a specification.

Figure 1:
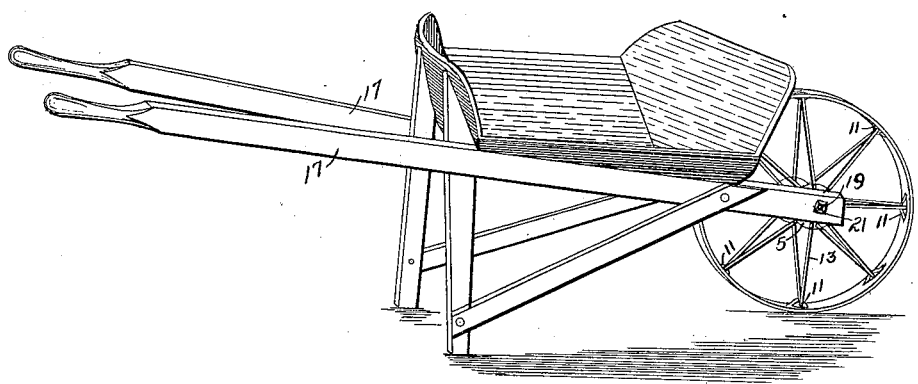
Figure 2:
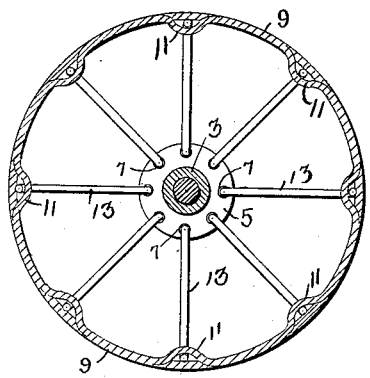
Figure 3:
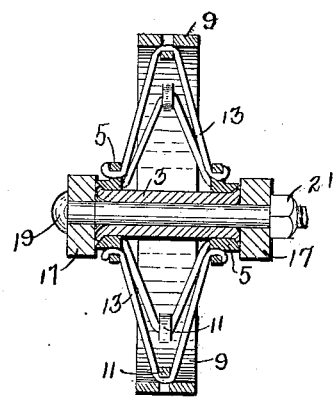

This invention relates particularly to improvements in the construction of wheels designed for use upon wheelbarrows, though capable of being used in other places; and the invention consists, generally, in the construction and combination hereinafter described, and particularly pointed out in the claim.
In the accompanying drawings, forming a part of this specification, Figure 1 is a perspective view of a wheelbarrow provided with a wheel constructed in accordance with my invention. Fig. 2 is a vertical section of said wheel through its center, taken on a plane at right angles to its axis. Fig. 3 is a vertical section through the wheel and the rails of the barrow on a plane at right angles to that of Fig. 2.
The hub of the wheel may be of any suitable construction. I prefer a hub consisting of a section of gas-pipe 3, with a collar 5 arranged at each end thereof, the collar being provided with a conical recess at its outer side and the end of the pipe being pressed outward to fill said recess and secure the collar in place. Each collar is provided with a series of openings 7. The rim of the wheel consists, preferably, of a metallic hook 9, provided with a series of loops 11 on its inner surface, said loops being formed by cutting parallel slots through the hoop and bending inward the strip of metal between said slots. The spokes of the wheel are formed of pieces of wire 13, that are passed through the loops 11 and then extend diagonally to the collars 5 and have their ends passed through the openings in said collars and bent upward or otherwise suitably fastened to the collar. By this means I form a simple, cheap, and durable wheel which is adapted for use for a wheelbarrow, or it may be made of any suitable size, and thus adapted for other purposes. Where the wheel is used upon a wheelbarrow it is arranged between the rails 17 in the usual manner and is secured in place by a bolt 19, which passes through said rails and wheel and is provided upon its end with a suitable nut 21.

I claim as my invention—

The combination, in a wheel, of a rim or tire provided with a series of loops 11, constructed by forming slots in said rim and pressing inward the material between said slots, and spokes 13, passing through said loops and having their ends secured to the hub of the wheel, substantially as described.

In the testimony whereof I have hereunto set my hand this 15th day of February, 1890.

ARTHUR O. HUBBARD.

In presence of—
A. M. GASKILL,
S. W. ROBERTS.